July 18, 1961

J. BALL 2,993,123

EDGE-LIGHTED PHOTO TIMER

Filed Sept. 21, 1955

INVENTOR.
JACK BALL
BY
Hyde, Meyer, Baldwin & Doran
ATTORNEYS

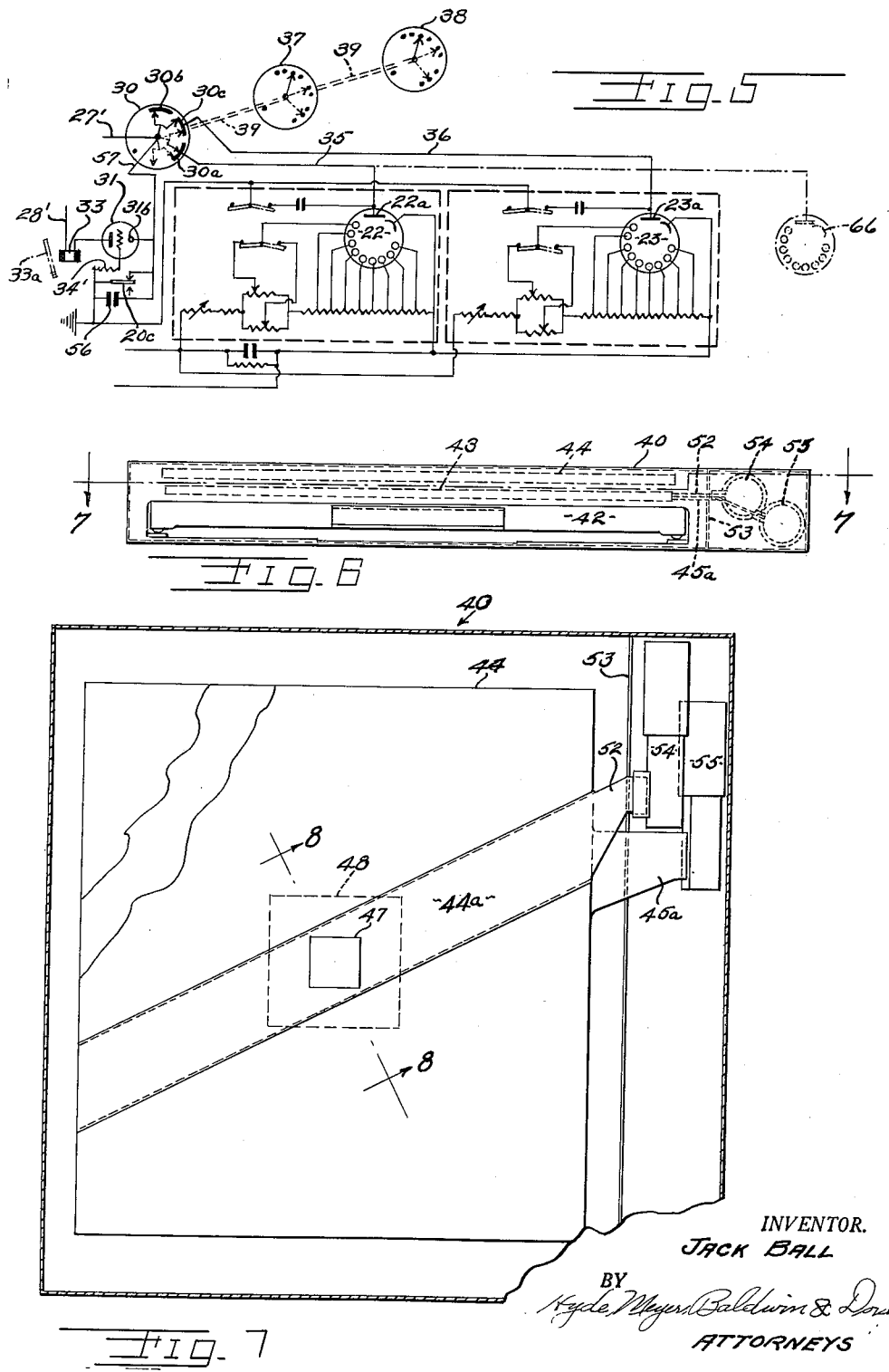

July 18, 1961 J. BALL 2,993,123
EDGE-LIGHTED PHOTO TIMER
Filed Sept. 21, 1955 3 Sheets-Sheet 3
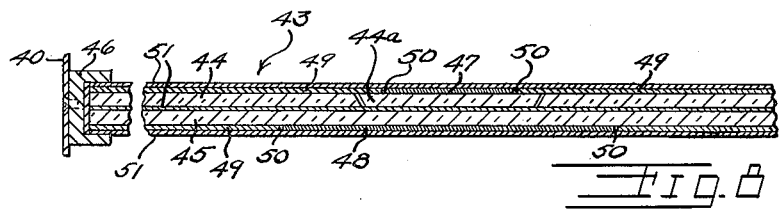
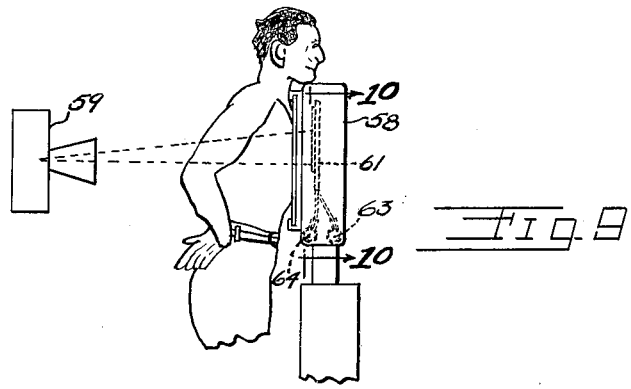
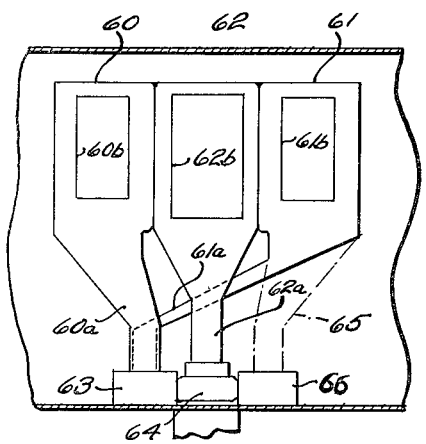
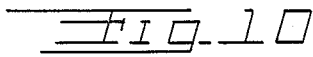
INVENTOR.
JACK BALL
BY
Hyde, Meyer, Baldwin & Doran
ATTORNEYS United States Patent Office 2,993,123
Patented July 18, 1961

1

2,993,123
EDGE-LIGHTED PHOTO TIMER
Jack Ball, Chesterland, Ohio, assignor to Picker X-Ray Corporation Waite Manufacturing Division, Inc., Cleveland, Ohio, a corporation of Ohio
Filed Sept. 21, 1955, Ser. No. 535,644
16 Claims. (Cl. 250—95)

This invention relates to X-ray apparatus and more particularly to a means for timing of exposures to X-ray radiation utilizing a photo timer responsive to the edge-lighted effect accompanying the use of plates of transparent material of relatively high refractive index.

One of the objects of this invention is to simplify the apparatus necessary to obtain a uniform good quality of film in X-ray photography through the use of automatic photo timers which utilize a fluorescent screen positioned in the path of the X-ray beam after it has passed through the subject, together with a photo tube which receives the light from the screen and is connected in a control circuit, such as that shown in United States Patent No. 2,541,187, granted February 13, 1951 to Ball and Graves. Such a timing circuit commonly uses a condenser, such as the condenser 31 in the above mentioned patent, to collect the current from the photo timer until the charge on this condenser reaches a critical value, after which it becomes conductive and operates a relay which interrupts the X-ray beam exposure. The time required for charging this condenser, and which determines the length of exposure, varies with the voltage applied to the photo tube, the size of the condenser and the intensity of the radiation reaching the fluorescent screen. It has been found that better results are obtained if the rays striking the fluorescent screen are limited chiefly to those passing through the anatomical region being investigated. For instance, a fluorescent screen area 1½ inches by 1½ inches in size gives good photo timing results for shoulder, scapula, knee, skull or gall bladder, but it is too small for such anatomical parts as the pelvis or stomach, where a larger screen area, for instance, 4 inches by 4 inches, gives better results.

One manner of handling this problem is shown in United States Patent 2,441,324, granted May 11, 1948 to Morgan and Hodges where a series of lead sheets are mounted on a rotatable steel disk, the respective sheets and the disks being formed with openings differing in size and number so that a different pattern of X-rays may fall upon the fluorescent screen depending upon the particular anatomical structure under examination.

An object of the present invention is to do away with such cumbersome structure as shown in this Morgan and Hodges patent and to provide different patterns and areas of fluorescent screen material always positioned in the path of the X-ray beam, and each transmitting light to its associated photo tube, so that it is only necessary for the operator to switch one or the other of the photo tubes into the control circuit depending upon the portion of the anatomy being examined.

In one form of the invention, a plurality of plates of transparent material of high refractive index are provided having parallel portions positioned in a housing and arranged to progressively receive X-rays passing through a body part under examination, the fluorescent screen material patterns being different on the respective plates. This invention teaches the use of such a plurality of plates either inside of the Bucky carriage between the Bucky grid and the cassette, or below the Bucky carriage.

In another form of the invention, three such plates of transparent material of high refractive index are provided in side by side relationship and substantially coplanar in a cassette changer. Two of these plates are spaced apart to register approximately with the right and left chest cavities of a person in an anterior-posterior position, with the third of the plates being positioned between the first and second plates and in a proper position to make a lateral exposure of the chest. The two plates opposite the right and left chest cavities respectively are operatively connected with photoelectric means positioned to receive light transmitted through the transparent plates and to receive and totalize the photoelectric effect from them, thus averaging out the conditions in the right and left chest cavities. The third plate is provided with its own photoelectric means independent of the first named means. Thus, it is necessary for the operator merely to switch from the one photoelectric means to the other depending upon whether he is making an anterior-posterior exposure, or a lateral exposure.

Other objects and advantages of this invention will be apparent from the accompanying drawings and description and the essential features thereof will be set forth in the appended claims.

In the drawings:

FIG. 5 is an electrical diagram indicating an X-ray tube control circuit for utilization of my invention;

FIG. 6 is a side elevational view of the device of FIG. 7 taken at the lower side of FIG. 7;

FIG. 7 is a sectional view taken along the line 7—7 of FIG. 6;

FIG. 8 is a fragmental sectional view, enlarged, taken along the line 8—8 of FIG. 7;

FIG. 9 is a side elevational view, somewhat diagrammatic, utilizing a form of my invention used in connection with cassette changer; while FIG. 10 is a fragmental sectional view enlarged taken along the line 10—10 of FIG. 9.

Figure 1:
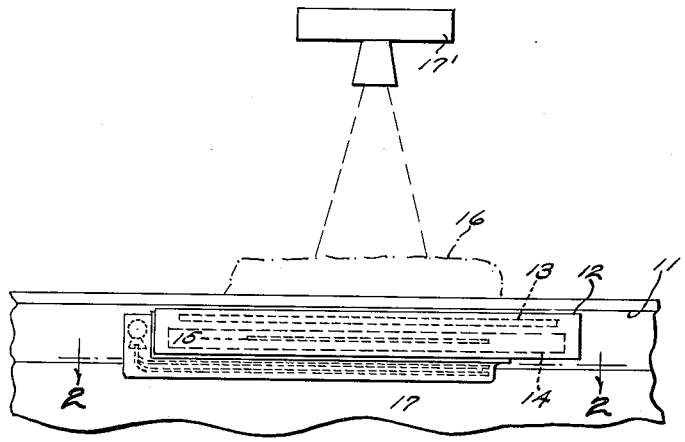
FIG. 1 is a fragmental side elevational view, somewhat diagrammatic, of the use of my invention below an X-ray examination table with the X-ray tube positioned above the table to pass the rays through a body being examined.

In FIG. 1 I have shown an X-ray examination table 11 beneath which is the usual reciprocating Bucky 12. This Bucky is equipped with the usual grid 13, and a cassette or film tray 14 within which is a film 15 for taking the X-ray photograph. The position of a body to be examined is indicated in dot-dash lines at 16 on top of the table 11. An X-ray tube is shown diagrammatically at 17' as positioned in the usual manner over the table so that the rays pass through the body 16 and cast the shadow to be photographed on the film 15. My inveniton is embodied in a housing 17 which in this case is secured below the Bucky as indicated in FIG. 1 and as shown in enlarged section in FIG. 3.

Figure 2:
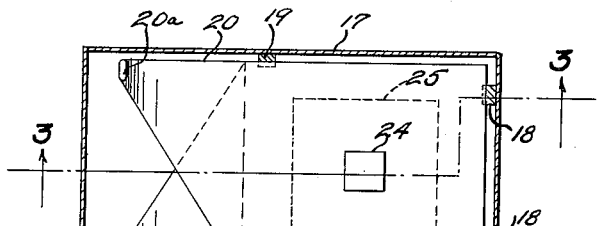
FIG. 2 is a transverse sectional view taken along the line 2—2 of FIG. 1.
Figure 3:
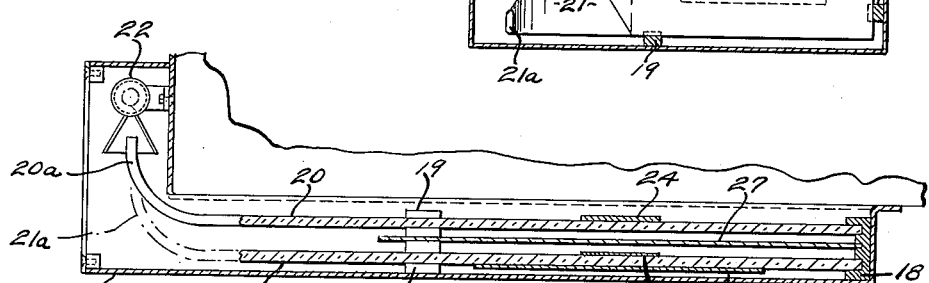
FIG. 3 is a sectional view enlarged taken along the line 3—3 of FIG. 2.

Referring now to FIGS. 2 and 3, inside of the housing 17 and suitably positioned as shown in FIG. 3 by positioning means 18 and 19, are two substantially parallel plates 20 and 21, each formed of transparent material of a high refractive index such as the synthetic plastic methyl methacrylate, one form of which is known as Lucite. This material has the characteristic that light received within the plate in any portion thereof is transmitted to the edge thereof. In this case, I utilize this characteristic of the material to transmit light in the plate 20 to the left-hand tapered end thereof as indicated in FIGS. 2 and 3, the far left-hand end being turned up as indicated at 20a so that the light discharging from the exit end of the tongue 20a impinges against a photoelectric tube 22 suitably mounted in the housing 17. In a like manner, the plate 21 terminates toward the left end in a terminal tongue portion 21a which is bent upwardly as indicated in dot-dash lines in FIG. 3 and the discharge end 21a lies in a position to discharge its light against a photoelectric tube 23 which lies in front of and in line with the tube 22 in FIG. 3 and is shown diagrammatically in FIG. 5. Fluorescent means is operatively associated with each of the plates 20 and 21 to present different patterns of light to each of these plate portions when the fluorescent material is subjected to X-rays. Hereinafter, in referring to "different patterns of light" I intend to include all commonly used patterns used in screening X-rays or fluorescent patterns from X-rays when photographing different anatomical parts of the body such as the patterns in the above mentioned Russell H. Morgan et al. Patent No. 2,441,324, and the patterns disclosed in the copending application of Jack Ball and John J. Russell, Serial No. 267,281, filed January 19, 1952, as well as the simpler patterns disclosed herein. In FIG. 3, I show a square of fluorescent screen material 24 approximately 1½ inches by 1½ inches square secured to the upper surface of the plate 20. This material is preferably of highly absorptive screen material such as Patterson B-2. The lower plate 21 has a larger area 25 on the lower surface thereof covered by the fluorescent screen material four inches square. Preferably, but not necessarily, the central portion of the fluorescent pattern 25 which registers with the smaller square of pattern 24 is covered by light impervious paper or the like as indicated at 26 of the same area, 1½ inches square, as the pattern 24. The reason for this paper screen 26 is that the screen pattern 24 acts as a filter over the central portion of the screen pattern 25 and its filter activity will vary over quite a range, say between 60 and 120 kilovolts, since the screen material is highly absorptive. To prevent this variation under changing conditions, I get a little better result if the paper screen 26 is set up to shield the fluorescent material 25 so that one gets only a hollow square result when utilizing this structure and utilizing the pattern 25 and plate 21.

Preferably, but not necessarily, a double sided reflector plate 27 may be placed between the plates 20 and 21 as indicated in FIG. 3. A suitable means for this purpose is a sheet of aluminum polished on both sides and supported in the position shown in FIG. 3. This doubles the effect of the screen 24 or 25 by reflecting the luminosity from screen 24 upwardly from the reflector 27 against the lower surface of the plate 20; or reflecting downwardly the luminosity from screen 25 against the upper surface of plate 21.

Figure 4:
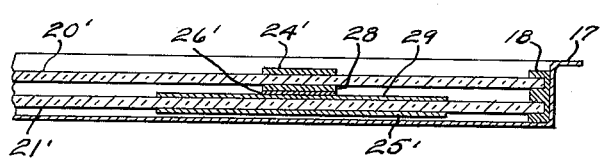
FIG. 4 is a fragmental sectional view corresponding to a portion of FIG. 3 but showing a modification of my invention as compared with FIG. 3.

In FIG. 4, I show another manner of obtaining more luminosity which is substantially the equivalent of the last modification found in the paragraph above. In FIG. 4, the plates 20' and 21' are substantially identical with the plates 20 and 21 described above except for the material secured to their surfaces to obtain fluorescent luminosity. The pattern 24' secured to the upper face of plate 21 is fluorescent material exactly like that described in connection with the pattern 24. Likewise, the pattern 25' of fluorescent screen material secured to the lower face of the plate 21' is exactly like the pattern described at 25 above. The modification here disclosed comprises a sheet of fluorescent screen material 28 1½ inches square secured to the lower face of the plate 20' in registry with the pattern 24'. This doubles the luminosity effect of the fluorescent material when it is struck by X-rays. In like manner, a pattern 29 of fluorescent screen material 4 inches square is secured to the upper face of the plate 21' in registry with the pattern 25'. This again will duplicate the luminosity when the pattern 25' and 29 is struck by X-rays. Preferably, a light impervious screen 26' is in registry with the patterns 24' and 28 for exactly the same purpose as the screen 26 defined in connection with FIG. 3.

A circuit for utilizing my photoelectric cell devices in a timing circuit for timing an exposure utilizing an X-ray tube in X-ray photography, is illustrated in FIG. 5. The view of FIG. 5 is intended to be incorporated in the complete timing circuit shown and claimed in United States Patent No. 2,541,187, granted February 13, 1951 to Jack Ball and Edward B. Graves, to which reference may be had for a more complete description. The trigger tube 31, relay 33, resistance 34' and condenser 56 with its short circuiting switch 20c are like the similarly numbered parts in the above mentioned Ball and Graves patent. Line 27' is the negative side of the rectified circuit and line 28' is the positive side of that circuit as shown in the patent. The photo tube 22 in the present disclosure of FIG. 5 takes the place of the photo tube 34 of the patent. The photo tubes 22 and 23, here disclosed, are of the general type shown in United States Letters Patent No. 2,231,697, granted February 11, 1941 to V. K. Zworykin et al., although it will be understood that other photo tubes may be used for this invention. The switch 30 is connected by line 57 with the cathode 31b of the trigger tube 31. When the switch is on the contact 30a, then line 35 connects photo tube 22 in the timing circuit. This is the dot-dash position of switch 30. When the switch is on contacts 30b and 30c (full line position), then line 36 connects photo tube 23 in the timing circuit as the controlling factor. When the switch is on contact 30c and 30a (dotted line position), then tubes 22 and 23 are connected in parallel into the timing circuit for a purpose which will presently appear.

The capacitor 56 is provided for collecting the electrons from the anode 22a of tube 22, or from anode 23a of tube 23, or from the anodes of both tubes, until a sufficient charge is collected to fire the trigger tube 31. The capacitor 56 is normally short-circuited through switch 20c until an exposure starts. At that time, the switch 20c opens and the capacitor begins to collect a charge. The factors involved in arriving at a proper exposure of a recording film depend upon the proper selection of the capacity of the capacitor 56, the potential to which it must be charged in order to fire the trigger tube 31, and the sensitivity and intensity of the light directed to the controlling photo tube or photo tubes.

The diagrammatic showing at 37 and 38 in FIG. 5 are circuit value selectors having a common actuator 39 connecting them with switch 30. By circuit value selector, I mean the selection of the proper kilovoltage on one deck 37 of a multiple deck switch while the proper milliamperage for the X-ray tube filament circuit is selected say on another deck 38 of the same switch. Other decks might select other circuit values. When the switch 30 is in the dot-dash position of FIG. 5, then photo tube 22 is placed in circuit and at the same time the proper circuit values for the X-ray tube are selected (see dot-dash position on decks 37 and 38) for the part of the body to be photographed such as a shoulder, scapula, knee, skull, etc. Then, when the exposure takes place, the small fluorescent screen pattern 24 of FIGS. 1 to 3 becomes the device which provides the luminosity to the photo tube 22 and thus becomes the controlling factor in timing the exposure. If, however, the part of the body being studied is the pelvis or stomach, then the operator may turn the switch 30 to the full line position indicated in FIG. 5 which places the photo tube 23 in the timing circuit and at the same time selects the proper circuit values for the X-ray tube on decks 37, 38 (see full line position), or other decks of the multiple deck switch. Then, when the exposure takes place, the larger fluorescent screen area 25 of FIGS. 1 to 3 controls the amount of luminosity which is effective on photo tube 23 and determines the end of the exposure.

FIG. 5 illustrates a third position of switch 30, an intermediate position in dotted lines where intermediate values are selected on the decks 37 and 38 intermediate the full line and dot-dash line positions previously discussed. In such a situation, the entire 4 inch square area of the fluorescent screen 24 plus 25 of FIGS. 1 to 3 provides the luminosity to the photo cells for determining the timing period, bearing in mind that with the light impervious screen 26, photo tube 23 received the light from a hollow square only.

Thus, in changing the X-ray photograph study from one anatomical part of the body to another, one does not have to shift pattern forming equipment as in the abovementioned Morgan et al. patent, but instead one merely has to change a switch such as 30 so that the proper photo tube is connected in the X-ray tube timing circuit and the timing limitation comes from a fluorescent screen of different pattern such as 24 or 25.

FIGS. 6, 7 and 8 show another modification of my invention wherein the sandwich of Lucite plates is placed inside of the Bucky and ahead of the cassette tray in the X-ray beam so that the Lucite plates are not subject to any filtering action through material in the cassette, such as lead, used for elimination of back scatter, as well as the steel or aluminum used in its construction and through which the X-ray beam must pass. Here the Bucky is indicated at 40 which would be placed below the top of the examination table 11 in the usual manner. Inside of the Bucky is the usual grid 41 and the cassete tray 42 which holds the film for exposure. Between the grid and the cassette tray, I place my Lucite sandwich 43 which is more clearly shown in FIGS. 7 and 8. Upper and lower parallel flat plates 44 and 45, respectively, are provided of Lucite or equivalent transparent material of a high refractive index. These plates are supported close together in suitable ways or brackets 46 secured to the housing 40. In this form of the invention, the plates 44 and 45 are say approximately ⅛ inch thick, whereas in the first described form, I prefer to use plates about ¼ inch thick. The upper plate 44 is cut away to form a separate strip 44a which lies in the same plane as the main portion of the plate 44 and fits snugly in the larger portion of the plate. In other words, the strip is simply cut through the plate 44 so that it is physically separated. The strip 44 is preferably dovetailed into the plate 44 as clearly seen in the upper portion of FIG. 8 so as to avoid X-ray image on the film of the cracks. On the upper surface of the strip 44a, preferably approximately in the center of the Bucky, there is secured a smaller pattern of fluorescent screen material, say approximately 1¾ inches square as indicated at 47. This pattern is of less width than the strip 44a. The fluorescent screen material at 47 is preferably very low absorptive material and much thinner than the pattern indicated at 24. To the lower face of the plate 45 there is secured a larger pattern of the same fluorescent screen material of low absorptive quality as indicated at 48 and this is approximately 4½ inches square and centered below the pattern material 47.

Preferably, to avoid shadows on the film, the entire area of the plates 45 and 44 and of the strip 44a outside of the screen material 47 and 48 are covered with a thin aluminum sheet 49 for compensation purposes, hereinafter called an aluminum compensator, about ¼ millimeter thick. The cracks 50 between the screen material and the aluminum compensator are filled with an aluminum powder or powdered screen material.

Preferably, but not necessarily, layers of black paper are used to cover the entire surfaces indicated at 51 to keep the entire sandwich light tight.

The strip 44a has an integral tongue 52 extending through a light tight partition 53 in the carriage or housing 40 and the free end or edge of the tongue 52 is positioned to direct its discharged light on a photo tube 54. In a similar manner, the plate 45 has an integral tongue 45a extending through the partition 53 and in a position so that light discharge from the free end of the tongue 45a impinges upon a photo tube 55. It will be noticed in FIGS. 6 and 7 that the photo tubes 54 and 55 are mounted in a narrow portion of the housing 40 just outside of the Bucky area. The plates 44 and 45 cover substantially the entire Bucky area.

In the use of the modification of my invention shown in FIGS. 6, 7 and 8, the photo tubes 54 and 55 are wired up in exactly the position of the tubes 22 and 23 of FIG. 5. Thus, when the operator desires to take a picture of a portion of the human body requiring the small pattern of fluorescent screen material shown at 47, he throws the switch 30 so that the photo tube 54 is in the control circuit for timing the X-ray exposure. On the other hand, when the portion of the body requires a pattern on a larger area such as 48, then he switches tube 55 into the circuit of switch 30 and at the same time selects the proper X-ray tube circuit values on the decks 37 and 38 as previously described.

The purpose of providing the relatively narrow strip 44a associated with the smaller screen pattern 47 is to minimize the dissipation of light. In other words, the light received through the smaller pattern provides a stronger result transmitted through the narrow strip 44a than it would if dissipated through the large plate 44.

While the devices so far described could also be incorporated into a cassette changer, I have shown still another use of an embodiment of my invention in a cassette changer as indicated in FIG. 9. Here the cassette changer is shown at 58 with a patient standing in front of the same and an X-ray tube 59 in position to cast a beam of X-rays through the patient so as to cast a shadow on the film in the cassette changer. In this form of my invention, three plates or paddles 60, 61 and 62 of transparent material of high refractive index are placed side by side in substantially the same plane as indicated in FIG. 10. Two of these plates, 60 and 61, are spaced apart to register approximately with the right and left chest cavities of a person in anterior-posterior position as shown in FIG. 9. The third of these plates, 62, is placed between 60 and 61 and is in a position to take an exposure of the cest cavity of a person in lateral position, namely, at right angles to the position indicated in FIG. 9.

As shown in full lines in FIG. 10, the paddles 60 and 61 have integral tongues 60a and 61a, respectively, extending downwardly and rearwardly so that their free ends discharge light into a single photo tube 63. The Lucite paddle 62 has a tongue 62a which conducts light from the paddle to a photo tube 64. Each of the paddles has a pattern of fluorescent screen material 60b, 61b and 62b, respectively, secured to one of its faces.

In the use of the form of my invention shown in FIGS. 9 and 10, the photo tubes 63 and 64 are positioned in the circuit of FIG. 5 in the same position as photo tubes 22 and 23 respectively. Then, when the switch 30 is positioned for an anterior-posterior exposure, the proper X-ray tube circuit values are simultaneously selected on the switch decks 37 and 38 and the switch 30 is set on the contact 30b for anterior-posterior position and the single photo tube 63 will totalize the effect of light received in the two paddles or plates 60 and 61. Then, if a lateral exposure is to be made, the switch 30 is shifted to the contact 30b so as to place the photo tube 64 in the timing circuit and at the same time other X-ray tube circuit values are selected on the decks 37 and 38. Thus, one may switch from one type of chest exposure to the other merely by turning the switch 30 and no changing of patterns is necessary in the cassette holder.

Those familiar with this type of X-ray photography will understand that it is desirable in taking an anterior-posterior exposure, that an averaging or totalizing of the effect from the right and left chest cavities is desirable as one of them may be so congested as to throw off the timing of the X-ray exposure unless averaged with the more normal lung.

A modification of FIG. 10 is indicated in dot-dash lines where the paddle 61 is provided with its own tongue 65 leading to a point where it discharges its collected light onto a photo tube 66 while the paddle 60 transfers its light through the tongue 60a to the photo tube 63. In this case, the wiring diagram is that indicated in dot-dot-dash lines in FIG. 5 where it will be recalled that the photo tube 63 was in the position of the photo tube 22. Then the tube 66 is connected in parallel with the tube 63 so that the output of the two photo tubes is thus totalized electrically rather than being totalized in a single photo tube as described in the previous embodiment.

It will thus be seen that I have provided a novel arrangement whereby patterns of various character may be arranged on different plates of Lucite or similar material which fit into a small space inside of or attached to the Bucky carriage, and the operator when switching to one part or another of the human anatomy does not have to change the screens of fluorescent material, but merely throws a switch so as to place one pattern or the other in position to control the timing of the X-ray exposure.

What I claim is:

1. A device adapted for use in combination with photoelectric means including a plurality of photo tubes for controlling an X-ray beam from an X-ray tube source having suitable energizing circuits including circuit value selectors and including at least one of said photo tubes, comprising a plurality of plates of transparent material of high refractive index, a portion of each of said plates positioned in the path of said beam, fluorescent means operatively associated one with each of said plate portions and presenting different patterns of light to each plate portion, said plates having other portions extending away from said pattern receiving portions and transmitting light through said portions each to its respective one of said photo tubes, and means for connecting each of said photo tubes into said circuits responsive to and operatively connected with its associated circuit value selector only.

2. A device adapted for use in combination with photoelectric means including a plurality of photo tubes for controlling an X-ray beam from an X-ray tube source having suitable energizing circuits including circuit value selectors and including at least one of said photo tubes, comprising a plurality of plates of transparent material of high refractive index, said plates having parallel portions positioned in a housing and arranged to progressively receive X-rays passing through a body part under examination, fluorescent screen material secured to said plates in different patterns respectively adapted for timing of X-ray photography of different anatomical parts, and said plates having other portions extending away from said pattern receiving portions and transmitting light through said portions each to its respective one of said phototubes.

3. The combination of claim 2 wherein the first of said plates to receive X-rays has a pattern of said fluorescent screen material covering a smaller area than the pattern area on a second of said plates to receive said X-rays, and both said areas being centered relative to the primary beam of said X-rays.

4. The combination of claim 3 including a light impervious screen on said second plate of the same pattern and area as said smaller area and registering therewith, said last-named screen between said X-ray beam source and said fluorescent screen material on said second plate.

5. The combination of claim 2 wherein said fluorescent screen material on the first of said plates to receive X-rays is on the side thereof toward said beam source, and said fluorescent screen material on a second plate receiving said rays passing through said first plate is on the side thereof away from said beam source.

6. The combination of claim 5 including light reflective X-ray pervious material between said plates having reflective surfaces facing in opposite directions toward and away from said source.

7. The combination of claim 2 wherein the first of said plates to receive X-rays has registering patterns on opposite faces thereof covering a smaller area, a second of said plates to receive X-rays has registering patterns on opposite faces thereof covering a larger area than that on said first plate, and all of said areas being centered relative to the primary beam of said X-rays.

8. A device adapted for use in combination with photoelectric means including a plurality of photo tubes for controlling an X-ray beam from an X-ray tube source having suitable energizing circuits including circuit value selectors and including at least one of said photo tubes, comprising a plurality of plates of transparent material of high refractive index, a portion of each of said plates positioned in the path of said beam, fluorescent means operatively associated one with each of said plate portions and presenting different patterns of light to each plate portion, said plates having other portions extending away from said pattern receiving portions and transmitting light through said portions each to its respective one of said photo tubes, and switch means for selectively connecting each of said photo tubes into said circuits responsive to and concurrently with the selection of respective first and second circuit value selectors, and for connecting both of said photo tubes into said circuits responsive to and concurrently with the selection of a third circuit value selector.

9. A device for use in combination with photoelectric means for controlling an X-ray beam comprising a housing, two plates of transparent material of high refractive index having generally parallel portions mounted in said housing, fluorescent screen material secured to said plates in different patterns respectively adapted for timing of X-ray photography of different anatomical parts, said pattern on one of said plates at least in partial registry with said pattern on the other of said plates, each of said plates having a projecting portion extending from said pattern-covered portion, and two photo tubes positioned on said housing one adjacent the free end of each of said projecting portions in position to receive light transmitted through the respective plates.

10. A device for use in combination with photoelectric means for controlling an X-ray beam comprising a Bucky housing having a Bucky grid and a cassette-receiving zone spaced from said grid, two plates of transparent material of high refractive index having generally parallel portions mounted in said housing between said grid and said cassette zone, fluorescent screen material secured to said plates in different patterns respectively adapted for timing of X-ray photography of different anatomical parts, said pattern on one of said plates at least in partial registry with said pattern on the other of said plates, each of said plates having a projecting portion extending away from said pattern-covered portion, and two photo tubes positioned on said housing one adjacent the free end of each of said projecting portions in position to receive light transmitted through the respective plates.

11. A device for use in combination with photoelectric means for controlling an X-ray beam comprising a housing, two plates of transparent material of high refractive index having generally parallel portions mounted in said housing, a strip of said transparent material less than the width of one of said plates lying in the same plane as said one plate and physically separated therefrom, fluorescent screen material secured to said strip in a pattern of small area less than the width of said strip, fluorescent screen material secured to the other of said plates in a pattern of an area larger than the pattern area on said strip, said strip and said other plate having projecting portions extending away from their respective pattern covered portions, and two photo tubes positioned on said housing one adjacent the free end of each of said projecting portions in position to receive light transmitted respectively through said strip and said other plate.

12. The combination of claim 11 including a layer of shadow compensating material covering the surface of said plates and said strip outside of the areas covered by said fluorescent screen material.

13. A device for use in combination with photoelectric means for controlling an X-ray beam comprising a housing, upper and lower flat plates of transparent material of high refractive index having generally parallel portions mounted in said housing substantially contiguous, the upper of said plates having a separate strip cut out of said plate material of less width than said plate extending across said upper plate in substantially the same plane and fitting snugly into the cut-away portion of said upper plate, fluorescent screen material secured to the upper surface of said strip in a pattern of small area less than the width of said strip, fluorescent screen material secured to the lower surface of said lower plate in a pattern of an area larger than the pattern area on said strip, means preventing transmission of light between said strip and said lower plate, and said strip and said lower plate having integral projecting tongues extending away from their respective pattern covered portions for conducting transmitted light to photoelectric devices.

14. A device adapted for use in combination with photoelectric means including a plurality of photoelectric means for controlling an X-ray beam from an X-ray tube source having suitable energizing circuits including circuit value selectors and including at least one of said photoelectric means, comprising a plurality of plates of transparent material of high refractive index, there being three of said plates substantially coplanar and positioned side by side in a housing, first and second of said plates being spaced apart to register approximately with the right and left chest cavities of a person in anterior-posterior position, the third of said plates being positioned between said first and second plates, fluorescent screen material secured to the surfaces of said plates, each of said plates having integral portions extending away from the portions covered with fluorescent screen material, one of said photoelectric means positioned adjacent the light-transmitting ends of said projecting portions of said first and second plates for receiving and totalizing the photoelectric effect therefrom, and another of said photoelectric means independent of said first-named means positioned adjacent the light-transmitting end of said projecting portion of said third plate and responsive to light transmitted therefrom.

15. The combination of claim 14 wherein said first-named photoelectric means comprises a single photo tube positioned to receive the light transmitted from both said first and second plates.

16. The combination of claim 14 wherein said first-named photoelectric means comprises two photo tubes positioned respectively to receive the light transmitted from said first and second plates, and an electrical circuit connecting the output of both of said tubes in parallel.

References Cited in the file of this patent
UNITED STATES PATENTS

| | | |
|---|---|---|
| 2,441,324 | Morgan et al. | May 11, 1948 |
| 2,695,964 | Schepker | Nov. 30, 1954 |
| 2,790,912 | Graves et al. | Apr. 30, 1957 |